Feb. 9, 1960
P. CHAMBADAL ET AL
2,924,074
HEAT-RECOVERING SUPERHEATING POWER PLANT
Filed Oct. 14, 1955
2 Sheets-Sheet 1
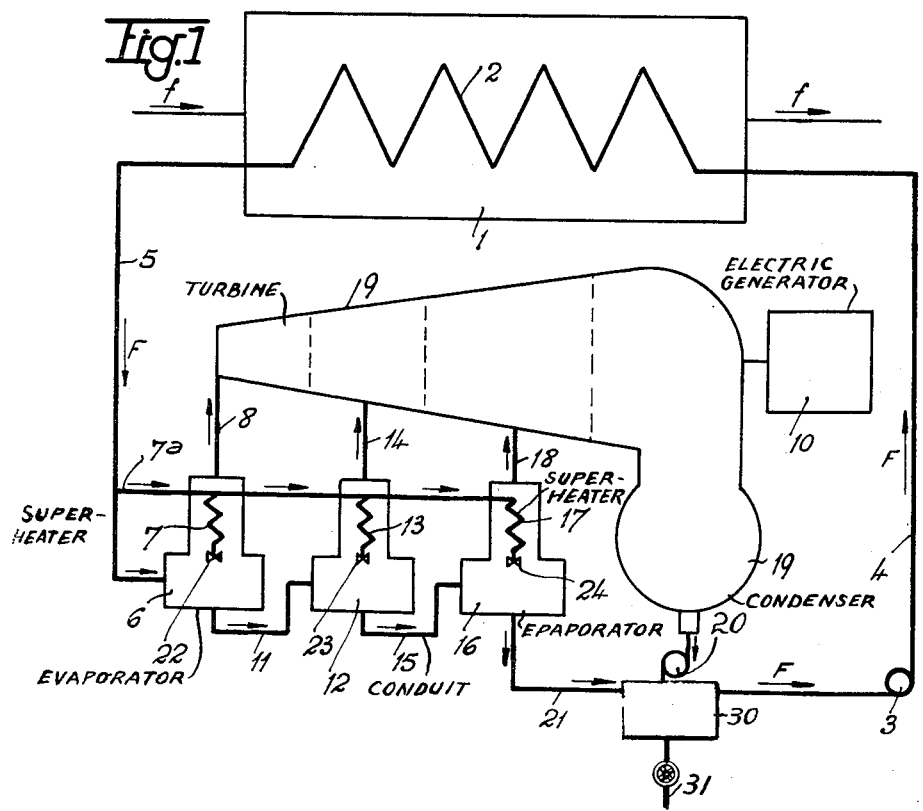
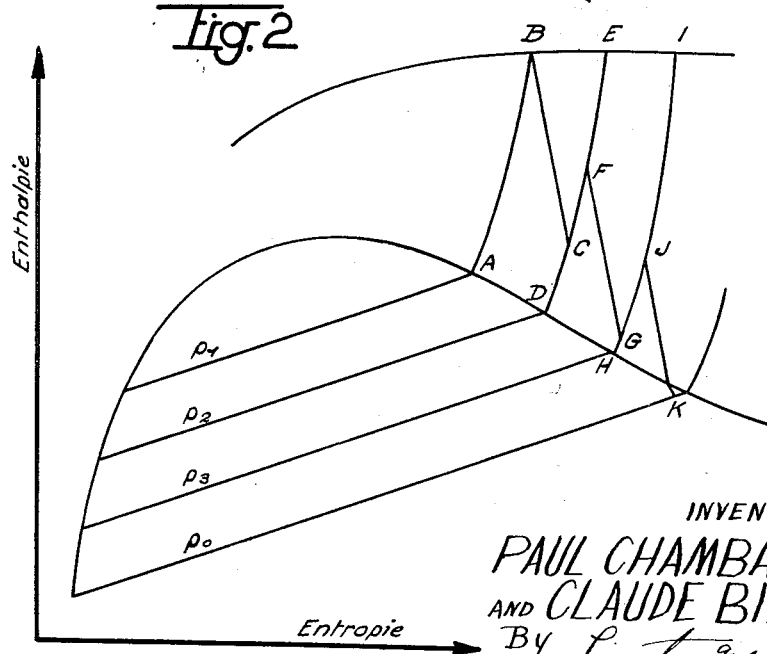
INVENTORS
PAUL CHAMBADAL
AND CLAUDE BIENVENU
By Linton and Linton
ATTORNEYS

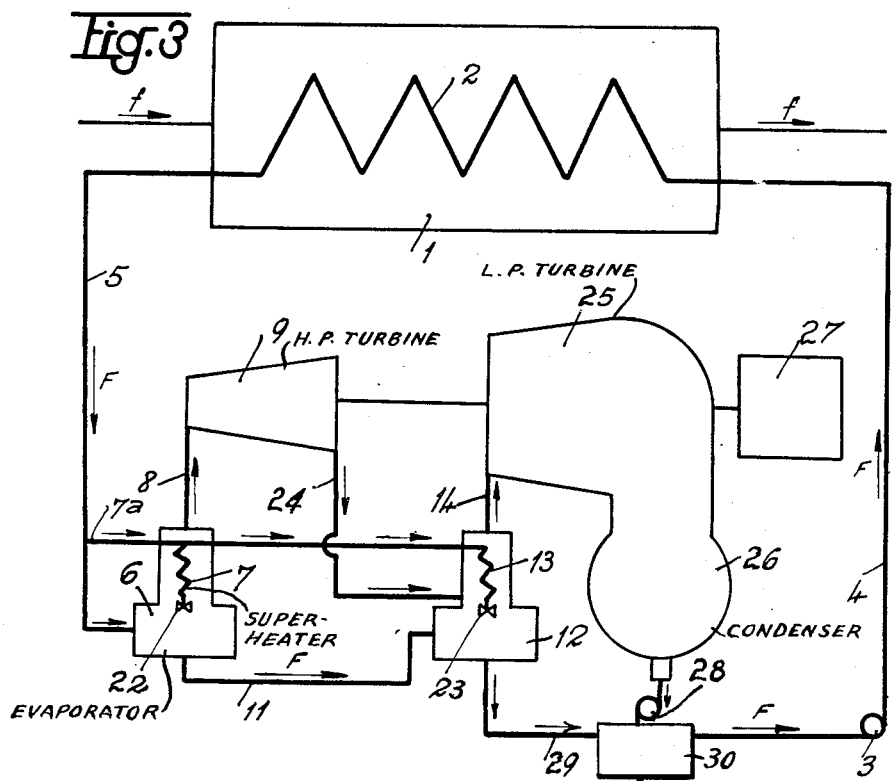
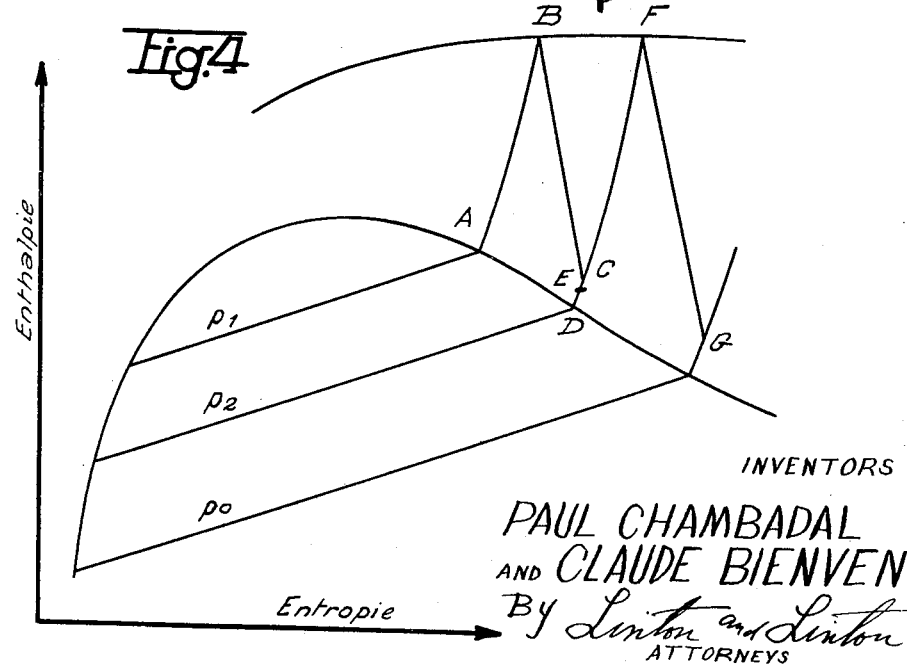
INVENTORS
PAUL CHAMBADAL
AND CLAUDE BIENVENU
BY Linton and Linton
ATTORNEYS United States Patent Office 2,924,074
Patented Feb. 9, 1960

2,924,074

HEAT-RECOVERING SUPERHEATING POWER PLANT

Paul Chambadal, Eaubonne, and Claude Bienvenu, Paris, France, assignors to Electricité de France-Service National, Paris, France, a national French organization Application October 14, 1955, Serial No. 540,592

Claims priority, application France October 16, 1954

2 Claims. (Cl. 60—73)

The present invention has for its object to provide apparatus for recovering the heat produced by chemical, physico-chemical or physical reactions such e.g. as nuclear reactions. It is a well-known fact that such plants produce large amounts of heat which are available when absorbed by a hot fluid and may serve for producing mechanical or electrical energy through the agency of a suitable heat engine or motor. Thus, in the case of a nuclear reaction, the evolution of heat is so considerable that it is necessary to cool the space inside which the reaction is performed, and the fluid cooling the said space, which cooling fluid may in fact take part in the reaction, carries along with it the heat to be recovered. If the temperature of the said cooling fluid is moderately high, an efficient recovery can be obtained only by using as an operative fluid a condensable fluid such e.g. as steam.

The production of steam, through the heat carried along by the so heated fluid, can be performed by inserting in the path followed by the hot fluid, a steam generator including a steam superheater, a tubular vaporizing bundle of pipes and a water heating arrangement.

In order to remove to a more considerable extent the heat contained in the heated fluid and to increase thus the power produced, it has already been proposed to insert in the path of the heated fluid a number of steam generators through which the hot fluid passes in succession and which produce steam at different pressures; the volumes of steam produced by these different steam generators feed either separate turbines or suitable stages of the same turbine. This prior solution proposed for the problem leads to a double drawback; on the one hand, it entails considerable losses of heat, both in the circuit of the hot fluid and in that of the steam produced; on the other hand, it requires the presence, in the channel through which the hot fluid flows, of intricate arrangements of which some are filled with steam, which results generally in the necessity of repeated upkeep work the performance of which may be difficult, in particular when the heating fluid is radio-active.

The present invention has for its object to avoid these drawbacks, while ensuring an extent of heat recovery which is at least equivalent to that which may be obtained by the above mentioned prior method.

In the present prior French Patent No. 1,085,116, filed on June 18, 1953, and covering an earlier method for using recovered heat, we have disclosed a method according to which the available heat was also transmitted to water which was in a liquid state, but, according to our said prior method, the heated water was transformed into saturated or superheated steam by heat supplied from an auxiliary source of heat constituted e.g. by a fuel burning in the firebox of a boiler.

According to a first feature of the present invention, the heating of the operative liquid fluid is performed inside an arrangement through which the hot reaction product fluid carrying the heat to be recovered is caused to flow while the said operative fluid is vaporized and the steam or vapor produced is superheated outside the said arrangement.

According to another feature of the present invention, the operative liquid fluid is vaporized and the vapor or steam obtained is superheated through the agency of the recovered heat transferred to the operative liquid fluid without it being necessary to resort to any auxiliary source of heat.

The present invention has also for its object, by way of novel article of manufacture, to provide an apparatus serving for the execution of the above defined method or intended for the application of the said method.

Further features of the present invention will appear from the following description, reference being made to the accompanying drawings given by way of examples and by no means in a limiting sense, wherein:

Figs. 1 and 2 are respectively a diagrammatic illustration of a first embodiment of a plant according to the present invention, and an explanatory chart corresponding to its operation;

Figs. 3 and 4 correspond to Figs. 1 and 2 respectively for another embodiment of the present invention.

Fig. 1 shows a first embodiment of the present improved apparatus in which the fluid, the heat of which is to be recovered, say a hot gas, flows in the direction of the arrow $f$ through a channel 1 inside which is fitted a heat-exchanger 2 of any known or suitable type such as a heat-exchanger provided with a tubular bundle of pipes or with plates, etc. Through this heat exchanger, flows a stream of water supplied by the pump 3 from a tank 30 and passing through the pipe 4 in the direction of the arrows F. Cold water may be supplied to tank 30 from a source 31. The throughput of water is calculated so that the water may be brought to a temperature differing but slightly from the temperature of the hot gas reaction product fluid entering the channel 1 while the water is allowed to absorb a large fraction of the heat contained in said hot reaction product fluid. The water is subjected to a pressure sufficient for preventing its boiling inside the heat exchanger 2. The heated water flows out of the heat exchanger through the pipe 5 and a first fraction of the total water throughput delivered from the heat exchanger is fed into an evaporator 6 where it is subjected to a reduction in pressure so that, consequently, it is partly vaporized at a pressure $p_1$ which is lower than the pressure of the entering water at the start as driven by pump 3. The steam so produced is in a saturated condition and its temperature is lower than that of the water at the input into the evaporator 6; it is consequently possible to bring the said steam into a superheated condition by causing it to pass over a worm superheater 7 which is heated by a second fraction of the total throughput of hot water passing out of the heat exchanger 2 and entering the said superheater through the pipe 7a. Said superheater provides for a heat exchange between a liquid and steam so that the coefficient of heat transmission is substantially improved and the heat exchanging surface required is smaller than that necessary in the case of a superheater heated by a gasiform fluid. The steam passing out of the said superheater is fed by the pipe 8 into the inlet of a steam turbine or motor 9 driving e.g. an electric generator 10.

The water which has not been vaporized and which is passing out of the evaporator 6 is still at a temperature higher than that of the cold water source and consequently it still contains a certain amount of heat to be recovered. In the case of Fig. 1, this water passing out of first evaporator 6 is sent through a pipe 11, into a second evaporator 12 where it is subjected to a partial vaporization under a pressure $p_2$ lower than that prevailing inside the preceding evaporator 6. In case of need, the steam produced inside said second evaporator may also be superheated by a superheating worm 13 which is fed with heat as in the case of the superheater 7 by a derived fraction of the total water throughput flowing out of the heat exchanger 2 through the pipe 7a. The steam produced inside the second evaporator 12 is fed through the pipe 14 either into a separate turbine or motor or else, as in the case illustrated, into an intermediate stage of the multistage turbine or motor 9. Similarly, at the output end of the second evaporator 12, the water which has not been vaporized may be sent through the pipe 15 into a third evaporator 16 also provided if required with a superheater 17 heated as precedingly with hot water in a liquid state.

The pipe 18 feeds into a further stage of the turbine or motor 9, the steam produced inside the third evaporator 16 under a pressure $p3$ which is lower than $p2$. The different steam fractions entering the successive stages of the turbine expand inside the latter down to the pressure $p0$ prevailing inside the condenser 19 at the output exhaust end of the turbine. The water extracted out of the said condenser is subjected to the suction of the pump 20 delivering it thenafter into the tank 30 where it mixes with the water flowing out of the third evaporator 16 through the output pipe 21. The suction end of pump 3 receives thus from tank 30 the totality of the output of water flowing out of the heat exchanger 2, including the water fraction which has served for heating the respective steam superheaters; these last fractions are as a matter of fact directed respectively into the corresponding evaporators after they have passed as required through the valves 22, 23 and 24 which allow adjusting the amounts of these superheating fractions of the throughput of water and thereby adjusting the superheating temperatures.

The water fed into the pump 3 is returned into the heat exchanger 2 where it is subjected to a further heating.

The number of evaporators which in the case of Fig. 1 is equal to three, may vary according to the power which it is desired to obtain on the shaft of the turbine or motor 9; the most economical number of evaporators may be estimated in each case in accordance with conventional calculation methods. Similarly the number of superheaters which in the case of Fig. 1 is equal to that of the evaporators, may as well be lower than said number. As a matter of fact, the pressure prevailing in the last evaporator or evaporators may be sufficiently low so that the expansion of the steam produced in said last evaporator, even without any superheating, does not lead to a too marked condensation. Obviously, the state of the steam at the end of the expansion depends on the throughput and on the condition of each steam fraction at its admission into the turbine or motor and also, on the efficiency of the different sections of the latter.

Fig. 2 is a Mollier chart showing enthalpy versus entropy in the course of passage of the steam in an apparatus according to Fig. 1. The first evaporator 6 produces saturated steam under a pressure $p1$; the condition of said steam is illustrated in the chart of Fig. 2 by point A. The passage through the superheater 7 increases the temperature of said steam so that the point representing the steam at the output of the superheater is B. The expansion of said steam inside the first stage of the turbine 9 between the pressures $p1$ and $p2$ is illustrated by the line B—C so that its condition under pressure $p2$ is shown by point C. Similarly the steam produced in the second evaporator 12 under a pressure $p2$ which is smaller than $p1$, is subjected to a superheating along line D—E; said steam is admixed with the steam which has expanded in the first stage of the turbine from pressure $p1$ down to pressure $p2$ and the condition of said mixture is illustrated by a point such as F.

The expansion within the turbine between pressures $p2$ and $p3$ brings the steam into a condition illustrated by the point G and it mixes then with the steam passing out of the third evaporator 16 in a condition illustrated by the point H and which is subjected by the corresponding superheater 17 to the superheating defined by the line H—I. The condition of this further mixture is illustrated on the chart by the point J while its further expansion between the pressures $p3$ and $p0$ is illustrated by the line J—K. Thus the point K defines the state of the steam at the exhaust end of the turbine or motor.

Fig. 3 illustrates a modified form of heat recovering plant similar to that illustrated in Fig. 1 but including only two evaporators while the steam expanding in the first high pressure turbine down to the pressure prevailing inside the second evaporator is superheated together with that produced in the latter.

As in the case of the apparatus illustrated in Fig. 1, the hot reaction product fluid the heat of which is to be recovered flows through the channel 1, inside which is inserted the heat exchanger 2 fed with water by the pump 3 through the pipe 4. The hot water produced is sent out through the pipe 5 into the first evaporator 6, inside which it is partly vaporized. The steam produced is superheated by a heat exchanger 7 fed with hot water tapped off the pipe 5 at 7a. A pipe 8 feeds the superheated steam into the input of the first high pressure turbine 9. A pipe 24 is fed with exhaust steam at the output of the first high pressure turbine 9 for the purpose of mixing said exhaust steam with the saturated steam produced inside the second evaporator 12 which is fed through the pipe 11 with the residuary unvaporized water remaining in the first evaporator 6. A heat exchanger 13 fed in parallel with the heat exchanger 7 serves for the superheating of this mixture of the two said steam fractions before said mixture passes into the output pipe 14 so as to be fed into the low pressure turbine 25 which is coupled, together with the high pressure turbine 9, with the alternator 27.

The steam expands inside the low-pressure turbine 25 down to the pressure prevailing inside the low-pressure turbine condenser 26. An extraction pump 28 sends the condensate into tank 30. Pipe 29 passing out of the second evaporator 12 to tank 30, in which tank said condensate mixes with the residuary water remaining inside the evaporator 12 and the mixture collected into the tank 30 is sucked in afterwards by the pump 3 located beyond the point of mixture of said condensate and the residuary water.

The valves 22 and 23 allow adjusting the superheating as disclosed precedingly with reference to Fig. 1. Obviously, the turbine may be constituted by a single body as in the case of Fig. 1 instead of two separate bodies 9 and 25 as in the case of Fig. 3 and reversely; the single body of Fig. 1 may be replaced by the two bodies of Fig. 3.

Fig. 4 illustrates the modification in the conditions governing the steam when it passes through apparatus according to Fig. 3. The steam flowing out of the first evaporator at a pressure $p1$ is subjected in succession to an isobaric superheating AB and to an expansion between the pressures $p1$ and $p2$ as shown by the line B—C. It mixes then with the saturated steam flowing out of the second evaporator as illustrated by the figurative point D. The mixture thus formed is in the condition illustrated by the point E. It is subjected to superheating at E—F and its expansion between the pressures $p2$ and $p0$ is illustrated by the line F—G and consequently the final condition of the steam is illustrated by the point G.

The particular embodiments of the present invention which have just been described form mere exemplifications thereof and many detailed modifications may be made therein without widening unduly thereby the scope of the invention as defined in the accompanying claims.

What we claim is:

1. An arrangement for recovering heat contained in a reaction product fluid heated by a chemical, physico-chemical or physical reaction, comprising a heat exchanger heated by the said fluid, means for feeding an operative reaction product liquid fluid through the said heat exchanger to be heated by the first mentioned fluid, at least one evaporator fed by the operative liquid fluid heated in said heat exchanger and in which said operative fluid is vaporized under reduced pressure conditions lower than those then existing in said heat exchanger, at least one superheater fed in parallel with the said evaporator and constructed to superheat the steam produced in the corresponding evaporator, a series of turbine sections fed by the vapor produced in the evaporators, means for superheating the exhausted vapor out of at least one turbine section and mixing it with the vapor formed in the superheated evaporators, means for mixing the vapor passing out of each superheater with the vapor produced in the corresponding evaporator, a condenser for the last turbine section, and means for recycling into the heat exchanger the condensed fluid flowing out of the condenser together with the non-vaporized operative fluid flowing out of at least one evaporator.

2. In a heat recovering power plant, a heat exchanger comprising a chamber and an exchange fluid conduit therein, a source of water connected to a first end of said conduit, a first evaporator and a second evaporator, the intake of said first evaporator being connected to the second end of said conduit, a superheating coil in said first evaporator connected to the second end of said conduit, the liquid outlet of said first evaporator being connected to the intake of said second evaporator, a superheating coil in said second evaporator connected to the second end of said conduit, a high pressure steam driven motor having its intake connected to the steam output of the superheating coil of said first evaporator, a low pressure steam driven motor having an exhaust condenser and having its steam intake connected to the low pressure exhaust of said high pressure motor and also to the steam output of the superheating coil of said second evaporator, the low pressure exhaust condenser from said low pressure motor and the liquid outlet of said second evaporator being connected to said source of water for recycling the residues from said condenser and said second evaporator, and a connection from the low pressure exhaust of said high pressure motor to the intake of said second evaporator.

References Cited in the file of this patent

UNITED STATES PATENTS

| | | |
|---|---|---|
| 1,258,165 | Trump | Mar. 5, 1918 |
| 1,745,964 | Uhde | Feb. 4, 1930 |
| 1,797,109 | Waterman | Mar. 17, 1931 |
| 2,035,726 | Sheldon | Mar. 31, 1936 |
| 2,088,623 | Thompson | Aug. 3, 1937 |
| 2,367,114 | Gilli | Jan. 9, 1945 |
| 2,469,635 | Dalin et al. | May 10, 1949 |